(12) United States Patent
Lynch et al.

(10) Patent No.: US 8,676,480 B2
(45) Date of Patent: Mar. 18, 2014

(54) THREE-DIMENSIONAL TRAFFIC FLOW PRESENTATION

(75) Inventors: James D. Lynch, Chicago, IL (US); William N. Gale, Oak Park, IL (US)

(73) Assignee: Navteq B.V., Veldhoven (NL)

( * ) Notice: Subject to any disclaimer, the term of this patent is extended or adjusted under 35 U.S.C. 154(b) by 102 days.

(21) Appl. No.: 13/408,475

(22) Filed: Feb. 29, 2012

(65) Prior Publication Data
US 2013/0226442 A1   Aug. 29, 2013

(51) Int. Cl.
*G06G 7/76* (2006.01)

(52) U.S. Cl.
USPC ........................ 701/119; 701/118; 340/995.13

(58) Field of Classification Search
USPC .................. 701/117–119; 340/995.12, 995.13
See application file for complete search history.

(56) References Cited

U.S. PATENT DOCUMENTS

| | | | | |
|---|---|---|---|---|
| 5,583,494 | A * | 12/1996 | Mizutani et al. | 340/995.14 |
| 5,699,056 | A * | 12/1997 | Yoshida | 340/905 |
| 5,908,464 | A * | 6/1999 | Kishigami et al. | 701/454 |
| 6,011,494 | A * | 1/2000 | Watanabe et al. | 340/995.14 |
| 6,349,262 | B1 * | 2/2002 | Lewiner et al. | 701/465 |
| 6,710,774 | B1 * | 3/2004 | Kawasaki et al. | 345/419 |
| 7,176,813 | B2 * | 2/2007 | Kawamata et al. | 340/995.13 |
| 7,274,306 | B2 * | 9/2007 | Publicover | 340/907 |
| 7,274,311 | B1 * | 9/2007 | MacLeod | 340/995.13 |
| 7,536,254 | B2 * | 5/2009 | Kumagai et al. | 701/117 |
| 7,848,880 | B2 * | 12/2010 | Cheung | 701/423 |
| 7,899,612 | B2 * | 3/2011 | Kumagai et al. | 701/117 |
| 7,949,491 | B2 * | 5/2011 | Smartt et al. | 702/167 |
| 8,024,110 | B2 * | 9/2011 | Fushiki et al. | 701/119 |
| 8,306,777 | B2 * | 11/2012 | Smartt et al. | 702/167 |
| 8,396,651 | B2 * | 3/2013 | Finnis et al. | 701/117 |
| 8,428,305 | B2 * | 4/2013 | Zhang et al. | 382/103 |
| 2008/0068222 | A1 * | 3/2008 | MacLeod | 340/995.13 |

(Continued)

FOREIGN PATENT DOCUMENTS

| | | |
|---|---|---|
| EP | 1826532 | 8/2007 |
| JP | 3402123 | 12/1998 |

(Continued)

OTHER PUBLICATIONS

Tanaka et al, Automatic Traffic Information Provision System Utilizing Facsimile and Telephone (Now Operating in Osaka), IEEE, Vehicle Navigation and Information Systems Conference, 1994, pp. 627-632.*

(Continued)

*Primary Examiner* — Russell Frejd
(74) *Attorney, Agent, or Firm* — Lempia Summerfield Katz LLC

(57) ABSTRACT

Traffic flow is viewed in mapping or navigation. A processor generates a two-dimensional map from a perspective view. The perspective view is at an angle, which is not a normal to the map, looking down on the two-dimensional map. At least one road or pathway represented on the two-dimensional map is identified. Traffic flow information is obtained for a plurality of locations along the at least one road or pathway. A line is projected along a third dimension on the two-dimensional map. The line is above the road or pathway from the perspective view. A height of the line is a function of the traffic flow information for the locations such that the height for a first of the locations is greater than for a second of the locations. The map is displayed with the line.

19 Claims, 4 Drawing Sheets

(56) References Cited

U.S. PATENT DOCUMENTS

| | | | |
|---|---|---|---|
| 2008/0094250 A1* | 4/2008 | Myr | 340/909 |
| 2010/0185382 A1* | 7/2010 | Barker et al. | 701/119 |
| 2010/0253544 A1* | 10/2010 | DeKock et al. | 340/936 |
| 2011/0106416 A1* | 5/2011 | Scofield et al. | 701/119 |
| 2012/0150436 A1* | 6/2012 | Rossano et al. | 701/450 |

FOREIGN PATENT DOCUMENTS

| | | |
|---|---|---|
| JP | 10332397 | 12/1998 |
| JP | 2006098279 | 4/2006 |
| JP | 2008256567 | 10/2008 |

OTHER PUBLICATIONS

5 NBC Chicago, webpages, 7-Day Weather Forecast, http://www.nbcchicago.com/traffic/, pp. 1-2, Feb. 7, 2012.

International Search Report and Written Opinion for related application No. PCT/EP2012/073779, mailed Apr. 2, 2013.

Machine Translation of Japanese Application No. JP 2006098279.

* cited by examiner

THREE-DIMENSIONAL TRAFFIC FLOW PRESENTATION

BACKGROUND

The present invention generally relates to mapping or navigation. Traffic information may be displayed on a map. Road sensors or other sources of data (e.g., probe data) indicate traffic flow. To communicate the traffic flow, the roads on a map are color coded. For example, red indicates slow flow or congestion and green indicates high flow or an open road. However, color coding of the map has poor resolution. Greater resolution traffic flow may be difficult to distinguish using color modulation of the road.

SUMMARY

In one aspect, a method is provided, such as for viewing traffic flow in mapping or navigation. A processor generates a two-dimensional map from a perspective view. The perspective view is at an angle, which is not a normal to the map, looking down on the two-dimensional map. At least one road or pathway represented on the two-dimensional map is identified. Traffic flow information is obtained for a plurality of locations along the at least one road or pathway. A line is projected along a third dimension on the two-dimensional map. The line is above the road or pathway from the perspective view. A height of the line is a function of the traffic flow information for the locations such that the height for a first of the locations is greater than for a second of the locations. The map is displayed with the line.

The paragraph above represents one of various aspects. The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Traffic flow is communicated in a way that "stop and go" or spatial variation in traffic flow may be perceived. The traffic flow is presented for a specific route or a regional map. A two-dimensional map is displayed with an extension in three-dimensions from the map plane. For example, average velocity or other traffic flow information may be displayed in a third dimension (e.g., height) along the route or road. The extension or projection is either a visual three-dimensional projection, such as for use with three-dimensional displays, or a is a three-dimensional projection as a representation in a two-dimensional image.

Using a height projection as the visual representation of the traffic flow may more efficiently display complex traffic flow as compared to just color modulating the roads on a map. The height may be easier to understand compared to a color coded display. High spatial frequency or resolution of velocity changes may be indicated. For example, stop light or sign controlled intersection and common "stop and go" locations may be more quickly perceived using a projected line or other height extension.

Probe data or historical traffic patterns are used as a source of the velocity or traffic flow data. The display of traffic flow as a line with height may vary due to different routes and/or times. A slider control or animation may show how the velocity or traffic flow of the route or map changes based on time of day.

Figure 1:
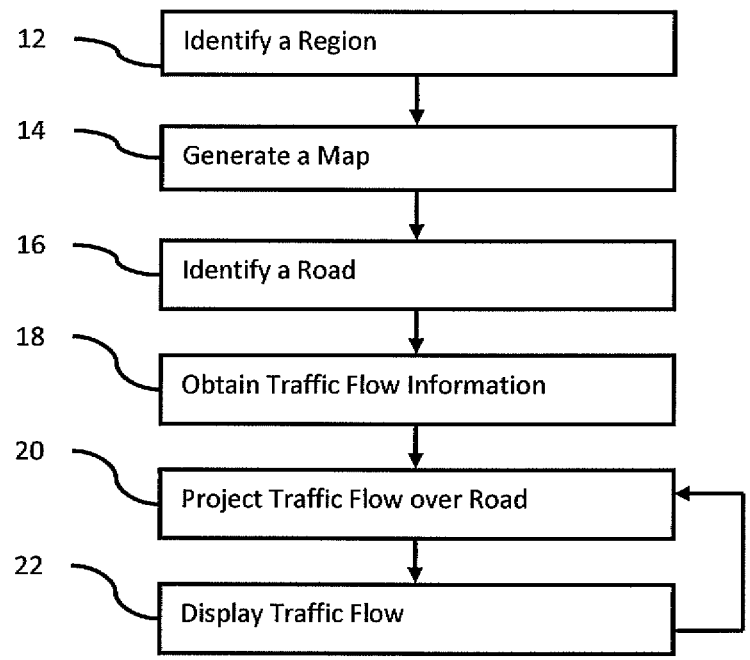
FIG. 1 illustrates a flow diagram of one embodiment of a method for three-dimensional traffic flow presentation.

FIG. 1 shows a method for three-dimensional traffic flow presentation. Traffic flow for a route or a region is presented on a map to assist the user. The traffic flow is presented as a projection from the map, such as plotting a line appearing to follow a road but vary in height above the road based on the traffic flow at different locations.

Additional, different, or fewer acts than shown in FIG. 1 may be used. For example, acts 12 and/or 16 are not performed. In another example, the map with the traffic flow projection is stored or transmitted and not displayed in act 22.

The acts are performed in the order shown. Different orders may be used. For example, the generate, identify, and obtain acts 14, 16, and 18 may be reversed, reordered, or performed simultaneously. As another example, the projection of act 20 is performed as part of generating the map in act 14, but after obtaining the traffic flow information in act 18.

FIG. 1 is from the context of a mobile device or personal computer. A processor of the mobile device or computer applies an algorithm to identify the location, generate a map, identify a road, obtain traffic flow information, project the traffic flow information over the road, and display the map with the overlay. The traffic flow information, map, map components, and/or projection of the traffic flow over the road on the map may be downloaded to the mobile device or computer and stored for performing the acts. The display of the mobile device or computer presents the map after processing to add the traffic flow projection to the map.

In other embodiments, some or all of the acts are performed by a server or processor associated with a collector of data, such as a mapping database/provider. The mobile device or computer may indicate a location, route, or region based on positioning circuitry or user input. The server may perform one or more of the other acts. For example, the map is generated in act 14, the road identified in act 16, traffic flow information obtained in act 18, and/or traffic flow projected over the road of act 20 is performed by the server and transmitted to the computer or mobile device. The map, with or without the traffic flow projection, may be generated by the server and transmitted to the mobile device. Likewise, route calculation may be performed by the server, mobile device, or computer. The acts are performed only by the mobile device or personal computer, only by the server, or in any combination by both the user device (e.g., mobile device or personal computer) and a server or servers.

In act 12, a region for a map is identified. A location may be entered by a user or may be the current location of a navigation device and the associated user. The location is coordinates in a world, region, or other frame of reference. Alternatively, the location is relative (e.g., 10 meters west of point of interest X). In alternative embodiments, the location is known, generalized to an area or region (e.g., Chicago region), or is not used.

In one embodiment, the location of a mobile device is detected. Positioning coordinates may be determined from a satellite system. A mobile device correlates spread spectrum signals form satellites to determine location, such as using the global positioning system (GPS).

Triangulation is alternatively used to determine the location. In triangulation, position circuitry includes a signal strength sensor or an array of signal strength sensors configured to measure the signal level from two or more antennas. The controller calculates the position of the mobile device from the signal strength measurements. Triangulation may be used in cellular networks, Bluetooth, or in wireless LAN and wireless mesh, as described in the IEEE 802.11 family of standards.

In addition or in the alternative to a signal strength sensor, the position circuitry may include a timer configured to measure the time necessary for a response from the network. The controller may estimate the position of the mobile device from the change in response times or by comparing response times from a plurality of antennas or access points.

In another example, proximity detection is used to determine location. A plurality of antennas is configured into a grid or other pattern. The position circuitry detects the closest antenna and the controller estimates the location of the mobile device. Proximity detection is limited by the density of the pattern of antenna. However, inexpensive technologies, such as radio frequency identification (RFID), are suited for dense grids of antennae.

The position circuitry may include relative position sensors in an inertial position system or dead reckoning system. Relative positions sensors include but are not limited to magnetic sensors (e.g., magnetometers, compasses), accelerometers, gyroscopes, and altimeters. Magnetic sensors determine the direction and/or strength of a magnetic field and can be used to determine heading or orientation. Inertial sensors, such as accelerometers and gyroscopes, measure acceleration, which can be used to calculate position, orientation, and velocity (direction and speed of movement) of the mobile device. An altimeter is a pressure sensor used to determine the relative altitude of the mobile device, which may be used to determine the vertical location of the mobile device.

In another embodiment, the location is entered by the user. The user of a mobile device or personal computer may enter an address, city, county, or select a location or link associated with a location. For example, the user is presented with a map or navigation user interface. The user selects a location by placing a cursor or typing in a location. The location may not be of a particular device, but is instead a location of interest to the user. In one embodiment, the user selects a link for or navigates to a website for traffic information. The location is selected based on the desired traffic information (e.g., Chicago region traffic).

The location may be associated with a route, such as a route for navigation. The user of a mobile device or personal computer may indicate beginning and ending locations. The mobile device, personal computer, or server determines a route between the two locations. The route may rely on different types of transportation, such as being a walking, driving, or boating route. The route may be determined based on shortest distance, shortest time, or other criteria. The route may be formed as a series of nodes, such as locations associated with intersections, and a series of links or segments, such as streets between nodes.

The route represents a collection of locations between and including the beginning and ending locations. Based on a current position of a user and mobile device or based on a user selection, one of the locations along the route is identified. Alternatively, processor-based or automatic selection of a location along the route may be provided. For example, a point of interest along the route is identified and information for the corresponding location is to be presented to the user.

The location may be selected in response to other criteria. The location may be for points along a route, such as navigation turns. One or more locations may be of interest. The location may be selected as any landmark, significant building, or interesting feature within the region of the map.

The location is the region, such as where the user indicates the location in broad terms (e.g., input a city name). Where the location is a point, address, or building, the location is used to select a surrounding region. Any size region may be selected, such as a square or rectangular region at a predetermined scale centered on the location. The region may be scaled to include all or portions of a route. The region may be associated with a road network, such as including major roads or highways for a city or city region. For example, the region corresponds to a traffic map area. The region is determined with any now known or later developed mapping or navigation technique. The region may alternatively be a pedestrian map (e.g., mall floor plan, or sidewalks). The traffic flow visualization may expose areas where people tend to move efficiently versus where people tend to congregate.

In act 14, a map is generated. The map is a two-dimensional graphic of the region. The graphic shows structures as lines and/or shading, including streets. Less than all streets may be shown, such as only showing highways. The map may or may not include building representations. The graphic is not a real-world view, but is instead a representation. The map may be a road map, a bike map, a pedestrian map, a floor map, or other map.

In alternative embodiments, the map is a satellite or other real-world view, such as oblique aerial imagery. Streets or other points of interest may be graphically overlaid on the map. The graphics are generated by a processor to represent real-world structure, but are symbols without being actual images. For example, a line or generally parallel lines represent a street. "Generally" may account for changes in the number of lanes or other deviations resulting from representing real-world structure with graphics.

The map is a two-dimensional representation. The map may not show elevation. Alternatively, elevation lines or other representation of elevation is included. In alternative embodiments, the map is an image or set of images for three-dimensional viewing. In alternative embodiments, the map may be a set of 3D geometry that represents detailed road structures. The structures represented in the map are modeled in three-dimensions and rendered from a given viewing direction.

The map is generated from a database. For example, the map is generated from a database of nodes and links or segments. Other formats may be used. The scale of the map is selected to indicate the size of the region represented by the map. The scale indicates which nodes and links to acquire for any given map. The route may be used to orient the map so that, given a scale, as much of the route as possible is shown on the map. Any now known or later developed map generation may be used.

The map shows a route. The route is represented as a graphic. For example, a colored, bold, or wide line representing the route is formed on or as part of the map. For driving or other navigation, the route may be along one or more streets. Alternatively, the route may be highlighted just by the projection of the traffic information where traffic information is not provided for roads or segments not part of the route. In an alternative embodiment, a route is not shown on the map. For example, one or more roads are shown on the map as part of a traffic flow map without a user specified or navigation route unique to a particular user.

The map is presented from a perspective view. The perspective view is a "birds-eye" view as if seen from above. Rather than being directly overhead, looking straight down along a normal to the map or along a line to the center of the earth, the overhead perspective is from a non-vertical view direction. The perspective view is at an angle, which is not a normal to the map, looking down on the two-dimensional map. Any angle away from normal may be used, such as an angle within 10-60 degrees. In one example, the angle is at about 20-30 degrees from vertical or normal to the map or earth surface (i.e., considered as a plane without curvature or as a spherical section filtered to remove hills or other non-flat features). The angle is away from a view direction towards the center of the earth. The angle is sufficient to allow a visual projection above one or more roads for traffic information. A height extension in a straight down view would not alter the visual. By using a perspective view, the height extension above the road may be viewed.

In act 16, at least one road is identified. The road or roads are streets represented on the two-dimensional map. The road is identified from the links and nodes of the mapping database. In one embodiment, all roads represented in the two-dimensional map are identified. Filters may be used, such as selecting roads based on the number of lanes, traffic volume, or type (e.g., selecting only highways or expressways). In another embodiment, the road or roads are selected based on navigation. The roads along a navigation route are selected. The navigation function indicates the links and nodes for a given route.

In addition to roads, lanes may be identified. Separate flow may be determined for different lanes. Color coding may be used to distinguish flow from different lanes, such as showing lines with height variation for different lanes of a same road in different colors.

In act 18, traffic flow information is obtained. The data is downloaded from, accessed in, provided by, or transferred from a database. Acquiring the traffic flow information from another source may be provided, such as obtaining the traffic flow information from a measurement source (e.g., directly from traffic sensors).

The traffic flow information is from probe data. Using anonymous information from mobile users, data may be gathered representing the flow of traffic at different locations and times. As users operate navigation devices, anonymous tracking information may be collected. GPS positions, WiFi or cell tower triangulation or other tracking may be used. Other probe data may also or alternatively be used. For example, tracking information from one or more fleets may be collected in a database. As another example, traffic sensors (e.g., embedded roadway sensors) indicate traffic flow. In yet another example, data from traffic studies is collected. Other sources may be traffic cameras (e.g., vehicle recognition used to track progress), accident reports, radio (e.g., ID of device via WiFi periodically along road), construction reports, weather condition reports, community sourced, or user traffic reports.

Traffic flow may be indoors or pedestrian based in addition to or as an alternative to vehicles. Traffic flow location may be expressed in terms of GPS position, or alternatively, in terms of TMC links which are an aggregation of NAVTEQ links for roadways. For example, the probe data is for cell phones of pedestrians rather than vehicles.

The probe data or other traffic flow information is collected in a database over time. The raw probe data is typically map-matched to associate data points to a particular road link before entering the data into the database, This historical traffic pattern data may be obtained by querying the database, such as a navigation or mapping provider database. The traffic flow information may alternatively or additionally include current data, such as traffic flow information from mobile device and/or tracking system use at a time of inquiry.

The traffic flow information is velocities. The speed at different locations is provided. Other types of traffic flow information may alternatively or additionally be used. For example, direction, acceleration, variance, and/or volume flow (e.g., number of vehicles per unit of time) may be used. In another example, road maintenance or other information representative of an effect on traffic flow is used. In yet another example, identified construction zones, pot hole information, or other obstruction information (e.g., police map for accidents) is used. Any information representing the flow or movement of traffic may be used.

The traffic flow information is for a plurality of locations. The locations are the links or segments between nodes and nodes of the roads. Alternatively, greater or less spatial resolution is provided, such as providing data for different locations in a same segment. Any spatial resolution may be provided, such as traffic data for each 10, 50, or 100 feet. The spatial resolution may vary, such as providing one location for every segment less than 100, and two locations for every segment greater than 99 feet but less than 200 feet. With locations at the end of the segments (e.g., node locations), traffic data is provided at a spatial resolution of about 3 locations every 70 feet. Other or lesser frequency may be used. Dual sets of flow information maybe stored based on multiple traffic directions on a link.

A derived or computed traffic flow model is generated from the raw probe datasets. Traffic flow information is computed as a single value for each location and travel direction along a link. For example, an average at the location is provided. The average may be associated with a period, such as a time of day, day of the week, day of the month, day of the year, or combinations thereof. For example, a different value is provided for every hour of every day of the week (e.g., value for 2 pm on a Tuesday). As another example, different values are provided for the same time of day and day of the week but different season (e.g., winter verses summer). Any temporal resolution may be provided, such as in 15 minute, 30 minute, 1 hour, or 2 hour increments. The temporal resolution may vary by time of day or day of week, such as being in 15 minute increments from 6 am-7 pm and 1 hour increments from 7 pm-6 am. Separate values may be provided for holidays.

The average is of the data collected from any source within that period. In an alternative embodiment, the traffic flow information includes other characteristics of the collected traffic flow information. For example, the variance of the velocities is provided. In yet other embodiments, the raw data or collected data is provided. For example, hundreds or thousands of collected velocities for each period are collected and obtained for a given location. In another example, the traffic flow may be computed as just the probability of being stopped versus moving.

An alternative embodiment may use a predetermined, fixed set of traffic flow shapes. In this case, each traffic flow location may just store the shape ID rather than actual values. This may be useful for data compression when delivering large datasets to a mobile user.

The traffic flow information for a current period is obtained. In other embodiments, the traffic flow information for a plurality of periods is obtained. A presentation with a temporal animation or user input control of a time (e.g., a time slider) may use traffic flow information over the plurality of different periods, such as sequential periods over two or more hours (e.g., throughout a rush period or all day).

The traffic flow information is obtained for the identified road or roads. For example, traffic flow information for all locations along a route is obtained. Data for less than all the locations may be obtained, such as where the user indicates a lesser resolution than the available data. As the region represented by the map is updated, additional traffic flow data is obtained. Alternatively, traffic flow data for locations not yet on the map is obtained. As another example, the traffic flow information for all or a sub-set of locations on the map is obtained. Traffic flow information for a traffic flow map of a highway system and/or street system is obtained for all locations along all of the roads.

In an alternative embodiment, traffic flow for a single vehicle trajectory is obtained. The progress of a given vehicle along one or more roads, as opposed to the aggregation of multiple vehicles, is tracked. The traffic flow indicated by this single vehicle is used as the traffic flow in general.

Figure 2:
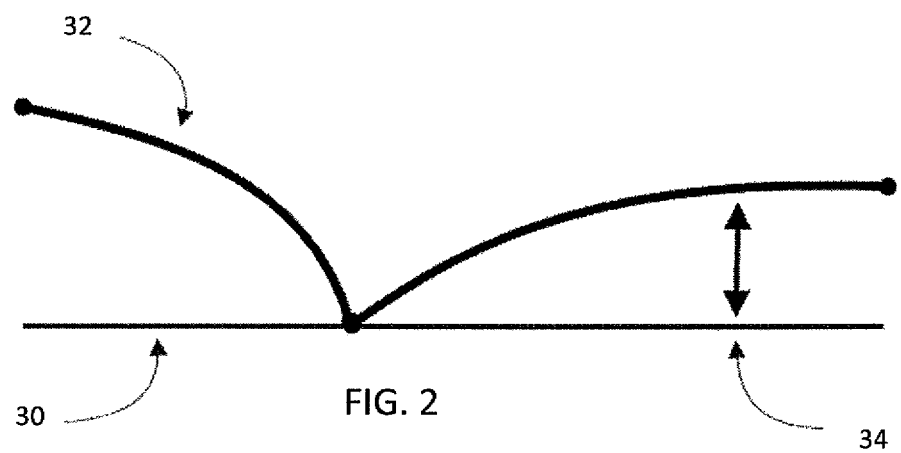
FIG. 2 illustrates an example side view of a projected line above a road.
Figure 3:
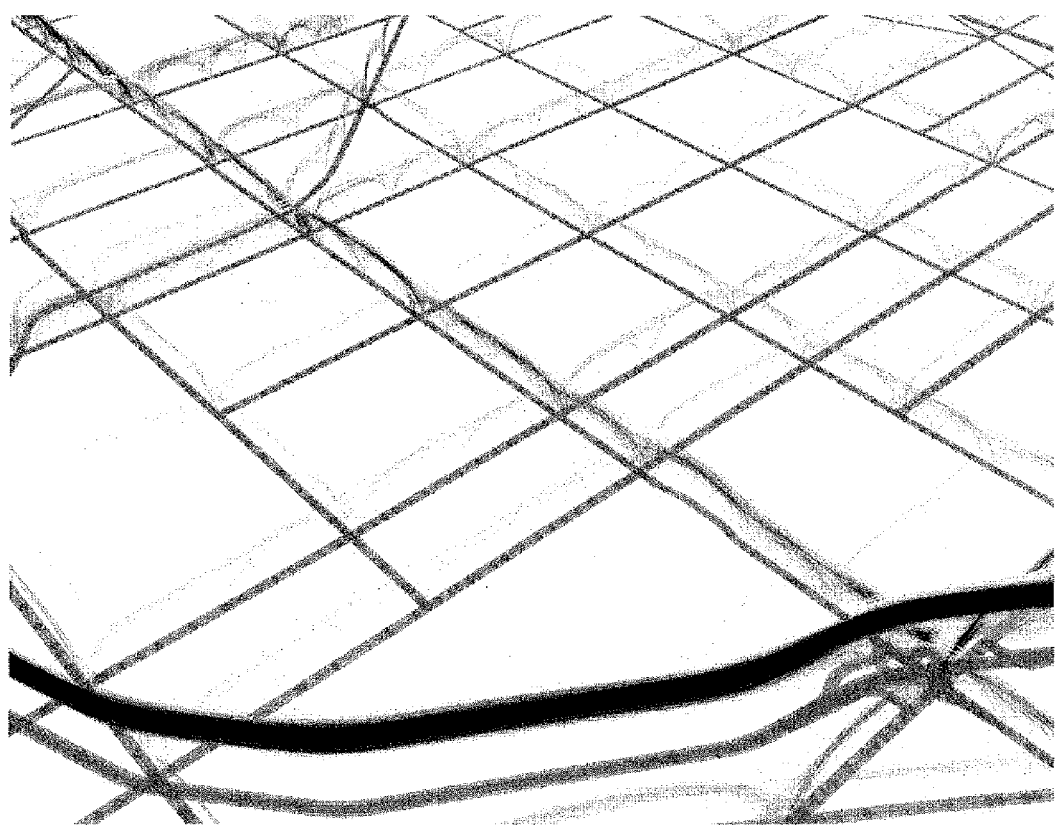
FIG. 3 illustrates one embodiment of a map with projected lines for traffic flow for multiple vehicle traces.
Figure 4:
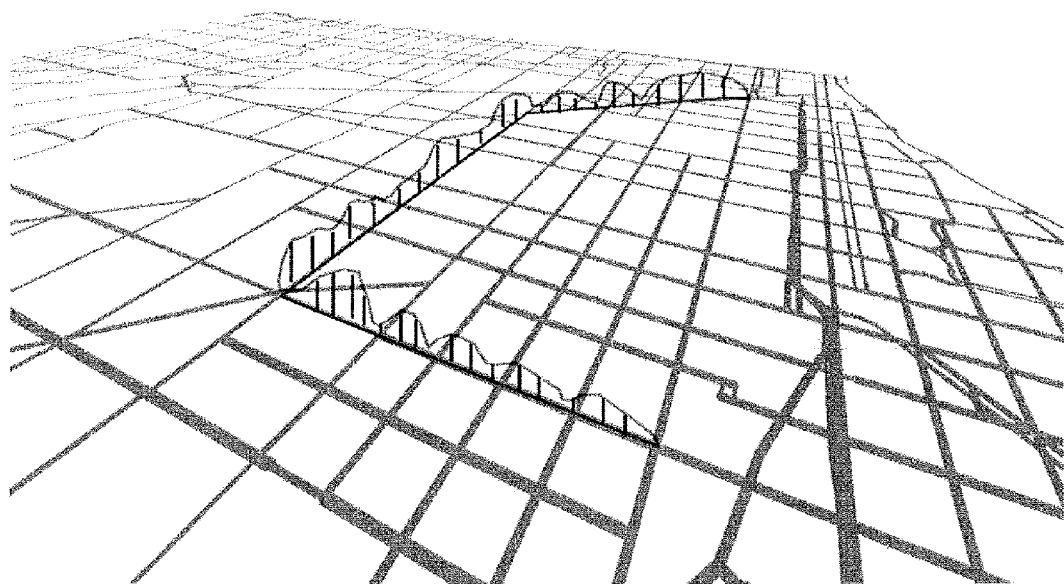
FIG. 4 illustrates another embodiment of a map with projected lines for a computed traffic flow model.

In act 20, a line is projected on the two-dimensional map. The line is projected along a third dimension. The projections results in the line appearing to be above the road in the perspective view of the map. For example, FIG. 2 shows a road 30 in a side view of a cross-section of the map. The map as displayed for the user extends into the drawing sheet. A line 32 projects along a height dimension. The map may be represented on an x and y plane with the road 30 in the plane. The line 32 extends from the map along a z dimension or axis (i.e., height). The height is represented by the double arrow 34. FIGS. 3 and 4 show such lines for roads in the maps from the perspective view for display. Due to the projection in height, the lines appear to be above the road, but are not on the road.

The height of the line above the road is a function of the traffic flow information. Since the traffic flow values for different locations may be different, the height of the line above the road varies. FIG. 2 shows an example where the height drops down to near the road 30, such as for an intersection, accident, or construction. While shown as a narrow portion, a broader reduction may be provided. FIGS. 3 and 4 show similar mapping with variation. FIG. 3 represents mapping from actual collected probe data in the Chicago, Ill., USA region. FIGS. 3 and 4 represent velocity as the traffic flow information.

Any scaling may be used. The function to map the traffic flow values for the different locations to height is linear or non-linear. The road may represent a zero level of traffic flow or a non-zero level. For example, the average velocities in an intersection may be 20 miles per hour less than at other sections, but still greater than zero. The line is mapped to height so that the typical or lowest average for a given road or on the map is at the road height (e.g., zero height). The dynamic range of the mapping may set the maximum height to avoid covering substantial portions of the map, such as less than 10% of an image height on the display. The height may be a non-linear mapping of velocity, such that low velocity changes are shown with larger height changes than higher velocities. Width of the line mapped to height may vary based on another parameter of the flow.

FIG. 3 represents mapping multiple values for each location. A wall of values is formed. The line is a fit line or is instead a visual line formed by the mapped values. The line is a top of a wall of height mapped values, a broad line (e.g., the wall as the line), or is a line of color where different values are coded by color. FIG. 4 represents mapping one average value for each location. An area under the line is represented as an opaque surface, but may be rendered as transparent or semi-transparent. Lines, texture, or other indications may be provided to emphasize the line and visually connect the height line to the road. Alternatively, the line is provided without any connection to the road other than being visually above the road in a same path and having one or more locations where the height of the line is near or at the road.

The line or values for forming the line may be filtered. For example, a low pass filter is provided to generally smooth rapid variation while still allowing the valleys associated with intersections. For mapping a plurality of values for each location, the values may be filtered as well. In alternative embodiments, no filtering is provided.

The projected lines extend above the roads. For example, FIG. 4 shows velocity along the route displayed as elevation above the 2D map plane. Stop and go intersections are clearly visible. Regions of more rapid travel are also shown. As another example, FIG. 3 shows intersections for the various larger roads in the map.

The projected line or lines are integrated into the map. The lines are formed as part of the map, such as the map being a frame of pixel (e.g., RGB) data without specific identification of any features. Alternatively, the line or lines is formed as an overlay for the map. The overlay is laid over or along the road.

The line, the area between the line and the road, or data mapped to various heights in each location may be color coded. For example, different colors are coded for different velocities or ranges of velocities. The velocity is visible by both the height and color of the probe points mapped to the height. Any color scheme may be used, such as red for lowest flow or velocity and green or purple for highest flow or velocity. In one embodiment, lines from traffic flow at different times are indicated on the same map, but in different colors.

FIG. 3 shows lines mapped for each or all of the large (e.g., four or more lanes) roads in a region. A traffic map is provided. The expressway has relatively few dips in traffic flow. The valleys shown are for on and off ramps, so the line maintains a generally steady higher velocity or height with a greater number of lower velocity or height data points for exiting and entering vehicles.

In an alternate approach for FIG. 2, a side view of a roadway is depicted with line replaced by a scatter plot. A scatter plot of probe points by velocity and position are plotted above the side view. The X axis is position and the Y axis is velocity. The diagram shows two factors simultaneously with the data. One would be the dip associated with stopping at an intersection. Superimposed on top would be another flow at high velocity with no stopping. This occurs with stop lights on a road, as some vehicles stop (Red light) and others pass through at speed (Green light).

FIG. 4 shows the lines mapped for a route. The line is projected along a navigation route. A conceptual image of a route is displayed as a 3D velocity map using a calculated velocity for each position along a selected route. As the direction or orientation of the route changes or shifts, the line correspondingly shifts. The line and/or area under the line may be rendered from the perspective of the viewer. For example, the areas in front of other areas occlude the areas behind.

Alternative routes may be indicated with their own projected lines, either simultaneously or sequentially. The comparison may assist in route selection.

Other line projections may be used. For example, a sequence of line projections on the map is provided. The line is projected for different traffic flow data, such as for different periods. By animating or adjusting a slider (e.g., a time-of-day slider), different projections may result as the average or data for the period may be different than for another period. The variation in height with or without variation in color through the sequence shows changing traffic flow.

In act 22, traffic flow is displayed in elevation on the map. The map is displayed as a computer generated graphic. The map includes a graphical model of roads (such as Fake Rd., Green St., Blue Ave., Airport Rd., $2^{nd}$ St., Main St., $1^{st}$ St., Maple Ave, and/or other roads or paths), points of interest (such as an airport, a park, or a building), and/or other geographic or map features. The map is or is not photo/video imagery data. For example, the map is a vector-based, tile-based, or other type of computer generated, graphical map model or representation. The roads in the map are displayed based on map data, such as a road segment and corresponding nodes, created by a map developer. Graphical representations of the map are generated and/or displayed based on such map data.

The map is displayed by rendering. For example, data representing a volume is created with the map and projections. Given a point of view, surface or projection rendering is performed to collapse the volume into a two-dimensional image. In another embodiment, the map is displayed as a two-dimensional image without three-dimensional rendering. The projection in the third dimension is added by altering pixel or other values of the two-dimensional image.

The map with traffic flow projection is displayed. A representation of a geographical region is displayed with traffic flow information represented as extending from the road in height. The map includes the line of traffic flow as appearing above one or more streets. The height of the line above the respective street is a function of the traffic flow. The line or data forming the line may be displayed in color or color coded. The color coding is mapped to the same or different traffic flow information as the height. For example, the height is mapped to velocity and the color is coded based on variance or other traffic flow information. The line has a different height for different locations, such as due to different average velocities along the road or roads.

The map may be for navigation. The map of a current position of the user may be displayed on a navigation device of the user. For example, the projection is for a navigation route on the map. The user may see real-time or expected traffic flow along their currently configured route. In another embodiment, the map is for other uses. For example, the map of an address or point of interest entered by a user may be displayed on a personal computer.

The map may be for other uses, such as a traffic map. The traffic flow is displayed in elevation for streets on the map regardless of any route other than the street layout itself. The height projection is used for all or other non-route selected sub-set of streets. Individualized or current navigation routes may be indicated, but the height projection of traffic flow is provided for streets that are not part of the route. No route is provided in other embodiments.

A feedback loop is shown in FIG. 1 from the displaying act 22 to the projection act 20. This feedback example is for repeating performance of the projecting and displaying for the traffic flow information of the different periods in sequence. The same map of the same region, same road or roads, and already obtained traffic flow information are used for showing the traffic flow at different times. In one embodiment, the region and road or roads stay the same. An animation is created or a slider is controlled to show the traffic flow for the region or route over time. Since the traffic flow may vary by the time of day, historical traffic flow information may be used as an estimate of the traffic flow for different times or periods. The display and projection are repeated in sequence for the different periods, showing the traffic flow as the flow varies due to time in addition to the variation due to location within the region.

Any number of the acts may be repeated. For example, the obtaining of traffic flow information in act 18 is also repeated with the projection and displaying. In other embodiments, the region and/or roads also vary during the repetition, such as where the traffic flow for different locations at different times represents travel along a route. The location changes to emulate travel by a device or user. The repetition is for navigation. The navigation is in the mapping sense, such as traveling while tracking position. Alternatively, the navigating is in the computer sense, such as the user navigating a user interface to enter or indicate a different location. The traffic flow represents changes with both the later time due to the travel and the location due to the travel. The map updates to be for an overlapping region such that part of the previous region is not displayed, part is displayed, and a new portion of region is added. The projection is for the route, all roads, or a subset of the roads in the current region for a given repetition. For use with a computer or mobile device with a user interface, the repetition may be in response to a user changing a cursor position, selecting a new route, changing the region (e.g., selecting a new scale, selecting a new region, or translating a current region), changing a period, changing a road, and/or combinations thereof.

The map, traffic flow information, projections, and/or display of traffic flow may be pre-computed and delivered as a sequence or as a video steam. The traffic flow and map are displayed in sequence. Alternatively, the map, traffic flow information, projections, and/or display of traffic flow is created, downloaded, accessed, or used as needed or sequentially.

Figure 5:
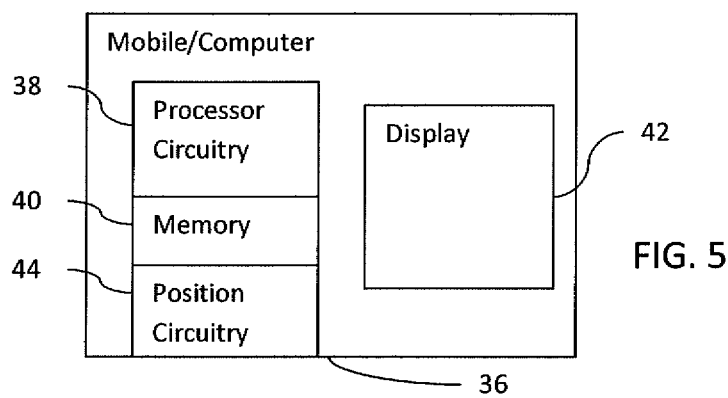
FIG. 5 illustrates a mobile device or computer for three-dimensional traffic flow presentation, according to one embodiment.

FIG. 5 illustrates an apparatus for three-dimensional traffic flow presentation. The apparatus is a mobile device or computer 36. As a mobile device 36, the apparatus is a cellular phone, mobile phone, camera, laptop, personal navigation device, portable navigation device, personal data assistant, computer, tablet, smart phone, or other handheld device capable of position sensing, map display, and/or navigation. The device may be carried with one hand, worn, or otherwise moved without assistance by others. As a computer 36, the device is a laptop, personal computer, desktop computer, tablet, server, workstation, or other computing device capable of accessing map information form the Internet or an intranet and displaying the map information.

The mobile device or computer 36 includes a processor or processing circuitry 32, a memory or database circuitry 34, a display 38, and position circuitry 44. As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Additional, different, or fewer components may be provided. For example, the processor 32 is not provided or not used, instead relying on the image to be displayed on the display 38 being communicated from a remote server through a transceiver of the mobile device or computer 36. In yet another example, the mobile device or computer 36 includes an input device, camera, and/or a communication interface. The input device may be one or more buttons, keypad, keyboard, mouse, stylist pen, trackball, rocker switch, touch pad, voice recognition circuit, or other device or component for inputting data to the mobile device or computer 36. The input device and the display may be combined as a touch screen, which may be capacitive, resistive, or surface acoustic wave-based sensor. The display 38 may be a liquid crystal display (LCD) panel, light emitting diode (LED) screen, thin film transistor screen, monitor, projector, CRT, or another type of display.

The communication interface may include any operable connection. For example, the communication interface is a cellular transceiver for cellular communications or a wireless networking (e.g., WiFi) transceiver. An operable connection may be one in which signals, physical communications, and/or logical communications may be sent and/or received. An operable connection may include a physical interface, an electrical interface, and/or a data interface. The communication interface provides for wireless and/or wired communications in any now known or later developed format. The same or different communications interface may be provided with the processor 32.

As a mobile device, position circuitry 44 may be provided. The position circuitry 44 may include components for one or more of a variety of location algorithms. The Global Positioning System (GPS) is a satellite based system for reliable and accurate positioning but has limitations in indoor environments. However, GPS may be combined with or replaced by other location algorithms. Cellular or other positioning systems may be used as an alternative to GPS. Other global navigation satellite systems, such as the Russian GLONASS or European Galileo, may be used. In some implementations, the position circuitry may be omitted.

The memory 40 is a volatile memory or a non-volatile memory. The memory 40 includes one or more of a read only memory (ROM), random access memory (RAM), a flash memory, an electronic erasable program read only memory (EEPROM), magnetic, optical, or other type of memory. The memory 40 is configured as a cache, buffer, local, remote, removable media, hard drive or other computer readable storage media. The memory 40 may be removable from the mobile device or computer 36, such as a secure digital (SD) memory card.

In one embodiment, the memory 40 is a local memory. The memory 40 stores a map, such as a computer generated graphic, accessed or downloaded by the processor 38. The graphic has an overhead perspective. The view is as if looking down from a bird's eye direction on a region, but at an angle to allow representation of height above the map. The map represents the region. The memory 40 may store the geographical location of the mobile device or computer 36 and/or a region input into or of the mobile device or computer 36. The stored map information may be based on the location and/or region information. The map may include an indication of the location and/or route, such as associated with an identified road or roads.

The memory 40 stores traffic flow data. The traffic flow data is for a current period, such as a fifteen or thirty minute window. Alternatively, the traffic flow data is for a different period than the current time. The traffic flow data may additionally be for other periods as well as a selected or current period. Traffic flow data for multiple periods may be stored for presentation over time.

The stored traffic flow data is velocities, volume flow, variance, or other indication of traffic. The data may be a given value for each location along a road or roads. For example, average velocities for respective locations during a given period are provided. Alternatively, multiple values for a given location and period are provided, such as the various measurements made at the location for the relevant period.

The memory 40 may be a database memory. Geographic locations, roads, map data, and traffic flow information are stored in the database. The database for the memory 40 of the mobile device or computer 36 may be a localized database, such as being for a region of operation of the mobile device or computer 36. For example, the information for locations within a threshold distance (e.g., kilometers) and/or up to a threshold amount of memory space is downloaded to the memory 40 of the mobile device or computer 36 for operation of the mobile device or computer 36. As long as the mobile device moves or the indicated location is within the region associated with the downloaded data, the database is sufficient. If the mobile device or computer 36 moves to another region, additional or different data is downloaded and stored.

The database may be a map database, including map data used for traffic maps or navigation data used for navigation-related services. The map data may include segment and node information. Other formats may be used for the map data. In one embodiment, the map database may be produced and/or maintained by a map developer, such as NAVTEQ North America, LLC located in Chicago, Ill. The map database may include traffic flow information, such as velocities for each of a plurality of locations associated with nodes or segments.

In one embodiment, the memory 40 is non-transitory computer readable medium configured to store instructions, executable by the processor 32, for displaying traffic flow on a map. The instructions for implementing the processes, methods and/or techniques discussed herein are provided on the computer-readable storage media or memories. The computer executable instructions may be written in any computer language, such as C++, C#, Java, Pascal, Visual Basic, Perl, HyperText Markup Language (HTML), JavaScript, assembly language, extensible markup language (XML), shader languages (HLSL, GLSL), graphics languages (OpenGL), and any combination thereof. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing, and the like. In one embodiment, the instructions are stored on a removable media device for reading by local or remote systems. In other embodiments, the instructions are stored in a remote location for transfer through a cellular network.

The processor 32 is a controller, general processor, digital signal processor, an application specific integrated circuit (ASIC), field programmable gate array, graphics processor, analog circuit, digital circuit, combinations thereof, or other now known or later developed processor/circuitry. The processor 32 may be a single device or combinations of devices, such as associated with a network, distributed processing, or cloud computing. The processor 32 may include or be connected with a communications interface. The processor 32 is part of the mobile device or computer 36.

The processor 32 is configured by software and/or hardware to generate a two-dimensional image. The two-dimensional image includes a line above a road. The line is formed from connected pixels or may be visually formed from plotted dots or measurements. The line is overlaid or integrated into a map graphic. The line runs along one or more roads of the map. Using the identified locations of the road within the map, the line is positioned relative to the road on the map. A height of the line above the road is a function of the traffic flow data. Any scaling, dynamic range, or function may be used to relate the distance in the image to height above the road.

In an alternative embodiment, the processor 32 is configured to generate the two-dimensional image without the map. Instead, the road is shown, such as the road 30 in FIG. 2. A road or route is shown with the traffic projection without the map. In one embodiment, the view is a side view, but may be a bird's eye perspective. A given route may be displayed as a straight line, despite any turns, with the traffic flow projected above the straight line.

The processor 32 causes the display 38 to display the image. For example, the display 32 displays the map with the included traffic flow projection. The traffic flow is integrated into the map or provided separate from the map.

The functions may be distributed in various ways between the processor 32 and a remote server. The memory 40 may not include a database, so the processor 32 communicates information needed by the server to generate a display with a map and traffic flow. The processor 32 then causes the server generated display to be displayed. The processor 32 alternatively receives the components of the image and forms the display. In other embodiments, the processor 32 constructs or acquires the components, such as selecting traffic flow from a database and/or forming the map.

Figure 6:
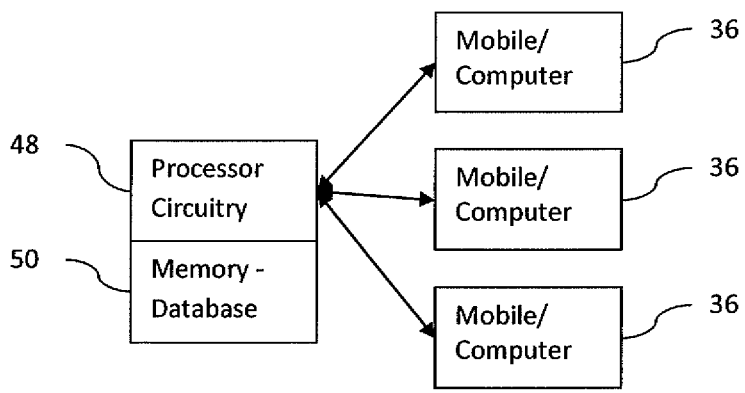
FIG. 6 illustrates a system, according to one embodiment, for three-dimensional traffic flow presentation.

FIG. 6 shows a system for traffic flow in mapping or navigation. The system includes a processor or processing circuitry 52 and memory or database 54 as part of a server remote from one or more mobile devices or computers 36. The processor 52 and memory 54 are in a different room, different city, or otherwise spaced from the mobile devices or computers 36. For example, the processor 52 and memory 54 are part of a server providing navigation or mapping information to cellular phones or personal computers. The processing is shared between the remote processor 52 and any given mobile device or computer 36.

FIG. 6 shows the system as a network where the processor 52 and memory 54 operate with a plurality of mobile devices and/or computers 36. Each mobile device or computer 36 is operated by a different user at different locations. Additional mobile devices 36, and/or processors 52 and memories 54 may be provided.

The mobile device or computer 36 includes network interfaces for wirelessly or wired connection to the processor 52. The mobile devices communicate over a network. Any protocol or physical connection may be used to couple the processor 52 to the mobile devices or computers 36. The communication paths may utilize cellular (e.g., 3G, 4G, or WiMAX), Ethernet, wireless, or any Internet protocol technologies. Alternatively, the communications network may be a private network that may not be connected to the Internet, a peer-to-peer network, or an ad-hoc network, such as a mobile mesh network including mobile devices and wireless links. In other embodiments, one or more of the mobile devices or computers 36 are connected through a wire, such as USB cable.

In one embodiment, the remote processor 52 outputs a collection of database information to the mobile device or computer 36. The collection is part of a database. The processor 32 of the mobile device or computer 36 selects traffic information from the collection. Differences in the location or time result in selection of different traffic flow information from the collection. The selected traffic flow information is different for different users based on the location of the mobile device.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:
generating, with a processor, a two-dimensional map from a perspective view, the perspective view being at an angle, which is not a normal to the map, looking down on the two-dimensional map;
identifying all of the roads represented on the two-dimensional map;
obtaining traffic flow information for a plurality of locations along all of the roads;
projecting, along a third dimension, lines, including a line, for all of the respective roads on the two-dimensional map, the line being above the road or pathway from the perspective view, a height of the line being a function of the traffic flow information for the locations such that the height for a first of the locations is greater than for a second of the locations; and
displaying the map with the line.

2. The method of claim 1, wherein generating comprises generating the two-dimensional map from the perspective view at an angle between 10-60 degrees from the normal to the map.

3. The method of claim 1, wherein generating comprises generating the two-dimensional map as a two-dimensional road map graphic of a represented region.

4. The method of claim 1, wherein identifying comprises identifying the one road and other roads along a navigation route, wherein obtaining comprises obtaining the traffic flow information for the locations along the navigation route, and wherein projecting comprises projecting the line along the navigation route.

5. The method of claim 1, wherein obtaining comprises obtaining probe data.

6. The method of claim 1, wherein obtaining comprises obtaining historical traffic pattern data.

7. The method of claim 1, wherein projecting the line comprises projecting different values of the traffic flow information for each location such that the line is a top of a wall of projected values.

8. The method of claim 1, wherein the traffic flow information for each location is averaged, and wherein projecting the line comprises spatially low pass filtering the averages, the line projected from the averages.

9. The method of claim 1, wherein obtaining the traffic flow information comprises obtaining the traffic flow information representing a plurality of different time periods;

further comprising:
repeating performing the projecting and displaying for the traffic flow information of the different time periods in sequence.

10. The method of claim 1, wherein obtaining the traffic flow information comprises obtaining velocities, and wherein the height of the line at the different locations is based on the velocities.

11. The method of claim 1, wherein displaying comprises displaying the line with a color mapped from the traffic flow information.

12. In a non-transitory computer readable medium storing instructions, executable by a processor, the instructions comprising:

identifying a region for a map;
displaying traffic flow in elevation on the map, the traffic flow information for each location being averaged and the averages being spatially low pass filtered such that the spatially low pass filtered averages are displayed as the traffic flow in the elevation.

13. The non-transitory computer readable medium of claim 12 wherein displaying comprises displaying the map as a computer generated graphic, and displaying the traffic flow as a projection above the map, the projection being for a route on the map.

14. The non-transitory computer readable medium of claim 12 wherein displaying comprises displaying a line as appearing to be above one or more streets, a height of the line being a function of the traffic flow.

15. The non-transitory computer readable medium of claim 12 wherein displaying comprises providing a colored line along one or more streets on the map.

16. The non-transitory computer readable medium of claim 12 wherein displaying comprises displaying the traffic flow in elevation for streets on the map regardless of any navigation route.

17. The non-transitory computer readable medium of claim 12 wherein displaying comprises displaying the traffic flow as velocity for different locations along one or more roads or pathways.

18. An apparatus comprising:

a memory having stored therein traffic flow data representing a plurality of different time periods;
a processor configured to generate a sequence through the different time periods of two-dimensional images, each of the two-dimensional images of the sequence comprising a line above a road or pathway, a height of the line above the road or pathway being a function of the traffic flow data for the respective time period; and
a display operable to display the image.

19. The apparatus of claim 18 wherein the traffic flow data comprises velocities, wherein the two-dimensional image includes a map, the line above the road or pathway included in the map.

\* \* \* \* \*